United States Patent
Tasaka et al.

(10) Patent No.: US 6,953,824 B2
(45) Date of Patent: Oct. 11, 2005

(54) THERMOPLASTIC ELASTOMER COMPOSITION, FORMED ARTICLE OF THE SAME AND COMPOSITE FORMED ARTICLE OF THE SAME

(75) Inventors: Michihisa Tasaka, Kanagawa-ken (JP); Takaaki Suka, Tokyo (JP)

(73) Assignee: Riken Technos Corp., Tokyo (JP)

( * ) Notice: Subject to any disclaimer, the term of this patent is extended or adjusted under 35 U.S.C. 154(b) by 246 days.

(21) Appl. No.: 10/245,714

(22) Filed: Sep. 18, 2002

(65) Prior Publication Data
US 2003/0105233 A1 Jun. 5, 2003

(30) Foreign Application Priority Data

Nov. 12, 2001 (JP) ...................................... 2001-345649
Apr. 9, 2002 (JP) ...................................... 2002-106621

(51) Int. Cl.[7] .............................................. C08K 5/01
(52) U.S. Cl. ........................ 524/476; 524/490; 524/505; 525/88; 525/98; 525/264; 525/314
(58) Field of Search ................................ 524/476, 490, 524/505; 525/88, 98, 264, 314

(56) References Cited

U.S. PATENT DOCUMENTS

| 4,994,508 | A | * | 2/1991 | Shiraki et al. | 524/14 |
|---|---|---|---|---|---|
| 5,191,024 | A | * | 3/1993 | Shibata et al. | 525/314 |
| 5,306,779 | A | * | 4/1994 | Shibata et al. | 525/314 |
| 5,346,964 | A | * | 9/1994 | Shibata et al. | 525/314 |
| 5,596,042 | A | * | 1/1997 | Itoh et al. | 525/98 |
| 5,702,827 | A | * | 12/1997 | Itoh et al. | 428/519 |
| 5,929,165 | A | * | 7/1999 | Tasaka et al. | 525/92 F |
| 5,936,037 | A | * | 8/1999 | Tasaka | 525/92 B |
| 6,048,933 | A | * | 4/2000 | Tasaka et al. | 525/92 F |
| 6,646,047 | B2 | * | 11/2003 | Tasaka et al. | 525/92 B |

FOREIGN PATENT DOCUMENTS

| EP | 0 770 645 A2 | 5/1997 |
|---|---|---|
| EP | 0 810 262 A1 | 12/1997 |
| EP | 0 845 498 A1 | 6/1998 |
| JP | 09-151295 | 6/1997 |
| JP | 2000-000978 | 1/2000 |

* cited by examiner

Primary Examiner—Bernard Lipman
(74) Attorney, Agent, or Firm—Armstrong, Kratz, Quintos, Hanson & Brooks, LLP (57) ABSTRACT

A thermoplastic elastomer composition excellent in softness, permanent compression set (both short- and long-term), and controlled in bleed-out of the softening agent as well as a formed article and composite formed article of the above thermoplastic elastomer composition. The thermoplastic elastomer composition contains: (a) 100 parts by weight of at least one hydrogenated block copolymer, (b) 30 to 150 parts by weight of a non-aromatic-type softening agent for rubber; and (c) 3 to 100 parts by weight of a petroleum hydrocarbon resin having a softening point of 80 to 170° C., the resin exhibiting a melt viscosity of 10 poise at a temperature in the range of 120 to 250.

14 Claims, 1 Drawing Sheet figure 1 figure 2 figure 3

THERMOPLASTIC ELASTOMER COMPOSITION, FORMED ARTICLE OF THE SAME AND COMPOSITE FORMED ARTICLE OF THE SAME

BACKGROUND OF THE INVENTION

1. Field of the Invention

This invention relates to a thermoplastic elastomer composition, and a formed article and a composite formed article of the same; more particularly to a thermoplastic elastomer composition excellent in softness, permanent compression set (both short- and long-term) and moldability, and having controlled bleed-out of the softening agent, as well as a formed article and a composite formed article of the same.

2. Description of the Art

Recently, thermoplastic elastomers, which are soft materials with rubber elasticity, need no vulcanization, and are as moldable and recyclable as thermoplastic resins, have been extensively used in various areas, such as in automobile parts, home electric appliances, wire coatings, medical equipment parts, footwear and miscellaneous goods.

Of the various thermoplastic elastomers, polystyrene-based elastomers, e.g., styrene-butadiene block copolymers (SBS) and styrene-isoprene block copolymers (SIS) which are block copolymers of an aromatic vinyl compound and an conjugated diene compound, are highly soft, have good rubber elasticity at normal temperature and give highly moldable thermoplastic elastomer compositions. As such, they are extensively used as substitutes for vulcanized rubber.

The elastomer compositions containing styrene and conjugated diene block copolymer, as one type of the above elastomers, whose intramolecular double bonds are hydrogenated, are more extensively used since they have improved resistance to aging under heat (thermal stability) and to weather.

However, the thermoplastic elastomer compositions containing the hydrogenated block copolymer still involves some problems in terms of rubber characteristics, e.g., resistance to oil, deformation rate (permanent compression set) under heated and pressurized conditions and rubber elasticity at high temperature. The compositions containing a hydrogenated derivative of the above block copolymer have been crosslinked to improve the above characteristics, and these crosslinked compounds are disclosed by, e.g., Japanese Patent Laid-open Publication Nos.S59-6236 and S63-57662, and Japanese Patent Publication Nos. H3-49927, H3-11291 and H6-13628.

However, the crosslinked compositions of hydrogenated block copolymers disclosed by the above patent publications still have problems of insufficient permanent compression set at high temperature, in particular at about 100° C., and tend to lose mechanical strength. Therefore, they are still short of the performance level which has been required in applications for vulcanized rubber. Moreover, they involve many moldability-related problems, e.g., low melt tension of the extruded article at high temperature thereby deteriorating its ability of keeping its shape, and extended molding cycles for injection-molded articles.

Each of the compositions disclosed by the above patent publications has a Shore A hardness of 40 or more, and is softened by increasing softening agent content. However, this causes practical problems, e.g., sticky surfaces of the molded article and bleed-out of the softening agent in the presence of stress under heating.

It is an object of the present invention to provide thermoplastic elastomer compositions excellent in softness, permanent compression set (both short- and long-term), and having controlled bleed-out of the softening agent. It is another object of the present invention to provide formed articles and composite formed articles of the above thermoplastic elastomer compositions.

SUMMARY OF THE INVENTION

The inventors of the present invention have found, after having extensively studied to achieve the above objects, that thermoplastic elastomer compositions excellent in softness, permanent compression set and moldability, and having controlled bleed-out of the softening agent can be obtained by melting and kneading a specific, hydrogenated polystyrene-based elastomer with a thermoplastic resin of low melting point and melt viscosity, thereby achieving the present invention.

A first aspect of the invention is a thermoplastic elastomer composition containing:
(a) 100 parts by weight of at least one hydrogenated block copolymer selected from the group consisting of:
 (a-1) a hydrogenated block copolymer obtained by hydrogenating a block copolymer composed of at least 2 polymer blocks A mainly based on an aromatic vinyl compound and at least one polymer block B mainly based on a conjugated diene compound, and
 (a-2) a hydrogenated block copolymer obtained by hydrogenating a block copolymer based on a conjugated diene compound;
(b) 30 to 150 parts by weight of a non-aromatic-type softening agent for rubber; and
(c) 3 to 100 parts by weight of a petroleum hydrocarbon resin having a softening point of 80 to 170° C., the resin exhibiting a melt viscosity of 10 poise at a temperature in the range of 120 to 250° C.

A second aspect of the invention is the thermoplastic elastomer composition of the first aspect which further contains (d) 0.01 to 3 parts by weight of an organic peroxide.

A third aspect of the invention is the thermoplastic elastomer composition of the first aspect which further contains (f) 0.1 to 25 parts by weight of a peroxide-decomposed type polyolefin resin.

A fourth aspect of the invention is the thermoplastic elastomer composition of the second aspect which further contains (e) 0.1 to 10 parts by weight of an ester-based crosslinking aid.

A fifth aspect of the invention is the thermoplastic elastomer composition of the second aspect which further contains (f) 0.1 to 25 parts by weight of a peroxide-decomposed type polyolefin resin.

A sixth aspect of the invention is the thermoplastic elastomer composition of the fourth aspect which further contains (f) 0.1 to 25 parts by weight of a peroxide-decomposed type polyolefin resin.

A seventh aspect of the invention is a formed article composed of the thermoplastic elastomer composition containing:
(a) 100 parts by weight of at least one hydrogenated block copolymer selected from the group consisting of:
 (a-1) a hydrogenated block copolymer obtained by hydrogenating a block copolymer composed of at least 2 polymer blocks A mainly based on an aromatic vinyl compound and at least one polymer block B mainly based on a conjugated diene compound, and (a-2) a hydrogenated block copolymer obtained by hydrogenating a block copolymer based on a conjugated diene compound;

(b) 30 to 150 parts by weight of a non-aromatic-type softening agent for rubber; and (c) 3 to 100 parts by weight of a petroleum hydrocarbon resin having a softening point of 80 to 170° C., said resin exhibiting a melt viscosity of 10 poise at a temperature in the range of 120 to 250° C.

A eighth aspect of the invention is an elastic part composed of the formed article of the seventh aspect for medical, food or bubble jet printer purpose.

A ninth aspect of the invention is a thermal adhesion formed composite article composed of the formed article of the seventh aspect and a formed article of polypropylene-based resin which are thermally adhered to each other under heating.

An tenth aspect of the invention is an elastic part composed of the thermal adhesion formed composite article of the ninth aspect for medical, food or bubble jet printer purpose.

A eleventh aspect of the invention is a formed article composed of the thermoplastic elastomer composition containing:

(a) 100 parts by weight of at least one hydrogenated block copolymer selected from the group consisting of:

(a-1) a hydrogenated block copolymer obtained by hydrogenating a block copolymer composed of at least 2 polymer blocks A mainly based on an aromatic vinyl compound and at least one polymer block B mainly based on a conjugated diene compound, and (a-2) a hydrogenated block copolymer obtained by hydrogenating a block copolymer based on a conjugated diene compound;

(b) 30 to 150 parts by weight of a non-aromatic-type softening agent for rubber;

(c) 3 to 100 parts by weight of a petroleum hydrocarbon resin having a softening point of 80 to 170° C., said resin exhibiting a melt viscosity of 10 poise at a temperature in the range of 120 to 250° C.; and (d) 0.01 to 3 parts by weight of an organic peroxide.

A twelfth aspect of the invention is an elastic part composed of the formed article of the eleventh aspect for medical, food or bubble jet printer purpose.

An thirteenth aspect of the invention is a thermal adhesion formed composite article composed of the formed article of the eleventh aspect and a formed article of polypropylene-based resin which are thermally adhered to each other under heating.

A fourteenth aspect of the invention is an elastic part composed of the thermal adhesion formed composite article of the thirteenth aspect for medical, food or bubble jet printer purpose.

DETAILED DESCRIPTION OF THE INVENTION

The thermoplastic elastomer compositions according to the present invention are described in more detail in terms of components, method of production, applications and so on in the following.

1. Components of the thermoplastic elastomer composition include as component (a), (1) at least one hydrogenated block copolymer selected from the group consisting of (a-1) a hydrogenated block copolymer obtained by hydrogenating a block copolymer composed of at least two polymer blocks A mainly based on an aromatic vinyl compound and at least one polymer block B mainly based on a conjugated diene compound, and (a-2) a hydrogenated block copolymer obtained by hydrogenating a block copolymer based on a conjugated diene compound, as component (a).

The hydrogenated block copolymer (a-1) for the thermoplastic elastomer compositions of the present invention, obtained by hydrogenating a block copolymer composed of at least two polymer blocks A mainly based on an aromatic vinyl compound and at least one polymer block B mainly based on a conjugated diene compound, is a polymer obtained by hydrogenating a block copolymer composed of at least two polymer blocks A mainly based on an aromatic vinyl compound and at least one polymer block B mainly based on a conjugated diene compound. Examples of the hydrogenated block copolymer (a-1) are the hydrogenated block copolymers of an aromatic vinyl compound and conjugated diene compound, having the structure of A-B-A, B-A-B-A or A-B-A-B-A.

The polymer block A mainly based on an aromatic vinyl compound may be composed only of the aromatic vinyl compound or a copolymer of the aromatic vinyl compound and a conjugated diene compound, the latter accounting for less than 50% by weight of block A.

The polymer block B mainly based on a conjugated diene compound may be composed only of the conjugated diene compound or a copolymer of the conjugated diene compound and an aromatic vinyl compound, the latter accounting for less than 50% by weight of block B.

The polymer block B mainly based on a conjugated diene compound for the hydrogenated block polymer component (a-1), obtained by hydrogenating a block copolymer composed of at least two polymer blocks A mainly based on an aromatic vinyl compound and at least one polymer block B mainly based on a conjugated diene compound, is not limited in extent of hydrogenation. However, it is preferably 50% or more, more preferably 55% or more, still more preferably 60% or more. Its micro structure is also not limited. When the block B is composed only of butadiene, for example, the 1,2-micro-structure preferably accounts for 20 to 50% by weight, particularly preferably 25 to 45% by weight, in the polybutadiene block. The 1,2bond may be selectively hydrogenated for the block. When the block B is composed of a mixture of isoprene and butadiene, the 1,2-micro-structure preferably accounts for 50% or less, more preferably 25% or less, still more preferably 15% or less of block B.

When the block B is composed of isoprene as the single component, preferably 70 to 100% by weight of isoprene in the polyisoprene block has the 1,4-micro-structure, and preferably 90% or more of the aliphatic double bond derived from isoprene is hydrogenated.

When the hydrogenated block copolymer is used for specific purposes, the above hydrogenated compound can be preferably used, as required, for these purposes.

It is preferred that the amount of the polymer block A present in the component (a-1) is 5 to 70% by weight, based on the weight of the component (a-1). Further, it is preferred that the total weight-average molecular weight of the component (a-1) is 50,000 to 550,000.

Specific examples of component (a-1) include styrene-ethylene/butene-styrene copolymer (SEBS), styrene-ethylene/propylene-styrene copolymer (SEPS), styrene-ethylene/ethylene/propylene-styrene copolymer (SEEPS), and styrene-butadiene/butylene-styrene copolymer (partially hydrogenated styrene-butadiene-styrene copolymer, SBBS).

A number of methods have been proposed for producing the block copolymer, obtained by hydrogenating a block copolymer composed of at least two polymer blocks A mainly based on an aromatic vinyl compound and at least one polymer block B mainly based on a conjugated diene compound. One representative method involves block polymerization effected in an inert medium in the presence of a lithium or Ziegler catalyst, as disclosed by Japanese Patent Publication No. S40-23798. The resultant block copolymer can be hydrogenated in an inert medium in the presence of a hydrogenation catalyst by a known method.

Hydrogenated block copolymers of a conjugated diene compound useful for the present invention as the (a-2) component include a block copolymer (CEBC) composed of a crystalline ethylene block and non-crystalline ethylene-butene block obtained by hydrogenating a block copolymer of butadiene. The hydrogenated block copolymers of a conjugated diene compound may be used either individually or in combination.

(2) Non-Aromatic-Type Softening Agent for Rubber as Component (b)

The non-aromatic-type softening agents for rubber as the component (b) for the thermoplastic elastomer compositions of the present invention include non-aromatic-type mineral oils, and liquid or low-molecular-weight synthetic agents. Generally, the mineral oil softening agents for rubber are mixtures of aromatic cyclic compounds, naphthenic compounds and paraffinic compounds. Those in which 50% or more of the whole carbon atoms is in paraffinic chains are called a paraffinic type; those in which 30 to 40% of the whole carbon atoms is in naphthenic rings are called a naphthenic type; and those in which 30% or more of the whole carbon atoms is in aromatic rings are called an aromatic type.

The softening agents of mineral oil for rubber useful as the component (b) for the present invention are paraffin- or naphthene-type. Use of an aromatic-type softening agent is undesirable, because it will make the component (a) soluble to retard the crosslinking reactions with the result that properties of the resultant composition may not be improved. The component (b) for the present invention is preferably paraffin-type, and those having a lower aromatic ring content are more preferable. Examples of liquid or low-molecular-weight synthetic softening agents include polybutenes, hydrogenated polybutenes and low-molecular-weight polyisobutylenes. Among these, polybutenes and hydrogenated polybutenes are preferred.

The non-aromatic-type softening agents for rubber preferably have a kinematic viscosity of 20 to 50,000 cSt at 37.8° C. and 5 to 1,500 cSt at 100° C., a pour point of −10 to −15° C., and a flash point (COC) of 170 to 300° C. Moreover, they preferably have a weight-average molecular weight of 100 to 2,000.

Component (b) is incorporated, when the component (a-1) is used as the component (a), at 30 to 150 parts by weight per 100 parts by weight of the component (a-1), preferably 50 to 120 parts by weight. At below 30 parts by weight, the resultant thermoplastic elastomer composition may have deteriorated moldability, excessively high hardness and deteriorated softness, with the result that the composition may not give a rubber-touch product. At above 150 parts by weight, on the other hand, the resultant thermoplastic elastomer composition is liable to suffer bleed-out of the softening agent, and exhibit formed article delamination and/or peeling of the components, deformation and flow marks on the surfaces.

Component (b) is incorporated, when the component (a-2) is used as the component (a), at 30 to 170 parts by weight per 100 parts by weight of the component (a-2), preferably 50 to 160 parts by weight. At below 30 parts by weight, the resultant thermoplastic elastomer composition may have deteriorated moldability, excessively high hardness and deteriorated softness with the result that the composition may not give a rubber-touch product. At above 170 parts by weight, on the other hand, the resultant thermoplastic elastomer composition is liable to suffer bleed-out of the softening agent, and exhibit formed article delamination and/or peeling of the components, deformation and flow marks on the surfaces.

(3) Petroleum Hydrocarbon Resin as Component (c)

The petroleum hydrocarbon resin component (c) for the thermoplastic elastomer composition of the present invention has the effects of accelerating dispersion of the rubber in the resultant thermoplastic elastomer composition, improving outer appearances of the formed article, and adjusting hardness and shrinkage. Examples of such petroleum hydrocarbon resins include aliphatic petroleum resins produced mainly from C5 fraction by-produced in the steam cracking of petroleum; aromatic petroleum resins produced mainly from $C_9$ fraction; and $C_5C_9$ copolymers obtained by copolymerizing the above-mentioned $C_5$ fraction with $C_9$ fraction. There is no particular limitation with respect to the type of the petroleum hydrocarbon resin as long as the resin exhibits the below-mentioned softening point and melt viscosity. It is preferred that the petroleum hydrocarbon resin is a copolymer having aromatic groups.

The component (c) has a softening point of 80 to 170° C., preferably 110 to 160° C. With a softening point of the component (c) outside of the above range, the resultant elastomer composition may have deteriorated balances among softness, permanent compression set and moldability. Moreover, with respect to the component (c), the temperature at which the component (c) exhibits a melt viscosity of 10 poise is 120 to 250° C., preferably 150 to 240° C. When this temperature is lower than 120° C., the resultant elastomer composition may have deteriorated rubber elasticity. When this temperature is higher than 250° C., the resultant elastomer composition may have deteriorated moldability.

Preferable examples of commercially available resins usable as the component (c) include aromatic group-containing resins, such as Endex 155 (a copolymer produced using an aromatic monomer, Eastman Chemical) and Kristalex 5140 (a copolymer of α-methylstyrene with styrene, Eastman Chemical).

The component (c) is incorporated at 3 to 100 parts by weight per 100 parts by weight of the component (a), preferably 10 to 50 parts by weight. At below 3 parts by weight, the resultant elastomer composition may have deteriorated moldability, and the formed article is liable to exhibit delamination and/or peeling of the components, deformation and flow marks on the surfaces. At above 100 parts by weight, on the other hand, the resultant elastomer composition may also have deteriorated moldability, excessively high hardness and deteriorated softness with the result that the composition may not provide a rubber-touch product.

(4) Organic Peroxide as Component (d)

The thermoplastic elastomer composition of the present invention may incorporate the organic peroxide component (d), as required. The organic peroxide component (d) functions to generate the radicals which are reacted with each other in a chain reaction manner to crosslink the component (a). Examples of compounds useful for the component (d) include dicumyl peroxide, di-tert-butyl peroxide, 2,5-dimethyl-2,5-di-(tert-butyl peroxy)hexane, 2,5-dimethyl-2,5-di-(tert-butyl peroxy)hexyne-3, 1,3-bis(tert-butyl peroxyisopropyl)benzene, 1,1-bis(tert-butyl peroxy)-3,3,5-trimethyl cyclohexane, n-butyl-4,4-bis(tert-butyl peroxy) valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, and tert-butylcumyl peroxide. Of these, 2,5-dimethyl-2,5-di-(tert-butyl peroxy)hexane and 2,5-dimethyl-2,5-di-(tert-butyl peroxy)hexyne-3 are particularly preferable for their characteristics related to odor, coloring and scorch safety.

When it is used, the component (d) is incorporated at 0.01 to 3 parts by weight per 100 parts by weight of the component (a), preferably 0.05 to 1.0 parts by weight. At below 0.01 parts by weight, the resultant thermoplastic elastomer composition may have insufficient resistance to heat and mechanical strength, because of insufficient crosslinking. At above 3 parts by weight, on the other hand, the resultant thermoplastic elastomer composition may have deteriorated moldability.

(5) Ester-Based Crosslinking Aid as the Component (e)

The thermoplastic elastomer composition of the present invention may incorporate an ester-based crosslinking aid as the component (e), as required. The component (e) may be incorporated during the crosslinking step in the presence of the organic peroxide component (d) in the production of the thermoplastic elastomer composition, to aid in uniform and efficient crosslinking reactions. When used in a relatively large quantity, it can adequately crosslink the non-aromatic-type softening agent for rubber, in particular low-molecular-weight paraffin-type oil or the like, to control its bleed-out from the thermoplastic elastomer composition.

The compounds useful for the component (e) include multi-functional methacrylate compounds, e.g., triallyl cyanurate, ethylene glycol dimethacrylate, diethylene glycol dimethacrylate, triethylene glycol dimethacrylate, tetraethylene glycol dimethacrylate, polyethylene glycol dimethacrylate having 9 to 14 recurring units of ethylene glycol, trimethylol propane trimethacrylate, allylmethacrylate, 2-methyl-1,8-octanediol dimethacrylate and 1,9-nonanediol dimethacrylate; multi-functional acrylate compounds, e.g., polyethylene glycol diacrylate, 1,6-hexanediol diacrylate, neopentyl glycol diacrylate and propylene glycol diacrylate; and multi-functional vinyl compounds, e.g., vinyl butylate and vinyl stearate. These compounds may be used either individually or in combination. Of these crosslinking aid compounds, the multi-functional acrylate and methacrylate compounds are more preferable, and triethylene glycol dimethacrylate and tetraethylene glycol dimethacrylate are still more preferable. These compounds are easily handled, function to solubilize the organic peroxide and hence function as a dispersion aid for the peroxide, and promote the uniform and efficient crosslinking reactions under heating, to provide a thermoplastic elastomer composition of well-balanced hardness and rubber elasticity.

The component (e) is incorporated, when it is used, preferably at 0.1 to 10 parts by weight per 100 parts by weight of the component (a), more preferably 0.1 to 3 parts by weight. At above 10 parts by weight, it may no longer exhibit its effect, because the resultant thermoplastic elastomer has a decreased extent of crosslinking due to the self-polymerization.

(6) Peroxide-Decomposed Type Polyolefin Resin as Component (f)

The thermoplastic elastomer composition of the present invention may incorporate a peroxide-decomposed type polyolefin resin as the component (f), as required. The component (f) can significantly improve thermal adherance of a formed article of the resultant thermoplastic elastomer with a formed article of peroxide decomposed type polyolefin resin.

The component (f) is composed of an olefin-based polymer or copolymer, thermally decomposed under heating in the presence of a peroxide to decrease its molecular weight and have increased fluidity while being molten. Compounds useful for the component (f) include isotactic polypropylene or copolymers of propylene with another α-olefin compound, e.g., ethylene, 1-butene, 1-hexene, 4-methyl-1-pentene or 1-octene.

The homopolymer portion of the above olefin-based copolymer preferably has a DSC-determined melting point (Tm) of 150 to 167° C., and ΔHm of 25 to 83 mJ/mg. Degree of crystallinity can be estimated from the DSC-determined Tm and ΔHm. The resultant thermoplastic elastomer composition may no longer exhibit improved resistance to oil and rubber elasticity at 100° C. or higher, when the homopolymer portion has the Tm or ΔHm outside of the above range.

The component (f) preferably has a melt flow rate (MFR, determined at 230° C. in accordance with ASTM D-1238) of 0.1 to 200 g/10 minutes, more preferably 0.5 to 100 g/10 minutes. At an MFR below 0.1 g/10 minutes, the resultant thermoplastic elastomer composition may have deteriorated moldability. At above 200 g/10 minutes, on the other hand, it may have deteriorated rubber elasticity.

The component (f) is incorporated, when it is used, preferably at 0.1 to 25 parts by weight per 100 parts by weight of the component (a), more preferably 1 to 20 parts by weight. At above 25 parts by weight, the resultant thermoplastic elastomer may have deteriorated softness and rubber elasticity.

(7) Other Components (g)

The thermoplastic elastomer composition of the present invention may incorporate one or more types of additives, in addition to the above-described components, as required. These additives include various types of blocking inhibitors, sealing improvers, heat stabilizers, antioxidants, light stabilizers, ultraviolet ray absorbers, lubricants, nucleating agents and colorants. Examples of antioxidants useful for the present invention include phenol-based antioxidants, e.g., 2,6-di-tert-p-butyl-p-cresol, 2,6-di-tert-butyl phenol, 2,4-dimethyl-6-tert-butyl phenol, 4,4-dihydroxydiphenyl and tris(2-methyl-4-hydroxy-5-tert-butylphenyl)butane; phosphate-based antioxidants; and thioether-based antioxidants. Of these, phenol- and phosphate-based antioxidants are particularly preferable. The antioxidant is incorporated preferably at 0 to 3.0 parts by weight per 100 parts by weight of the components (a) to (f) totaled, particularly preferably 0.1 to 1.0 parts by weight.

2. Method of Producing the Thermoplastic Elastomer Composition

The thermoplastic elastomer composition of the present invention can be produced by kneading the components (a) to (c), and, as required, optional components (d) to (g), which may be incorporated simultaneously or in an optional sequence.

The melting/kneading method is not limited, and the known method may be used. For example, these components may be molten and kneaded by a single screw extruder, twin screw extruder, roll, Banbury mixer, or various types of kneaders. The melting and/or kneading steps may be effected continuously by, e.g., a twin screw extruder of adequate L/D ratio, Banbury mixer or kneader. The preferable melt kneading temperature is 160 to 220° C.

3. Use of the Thermoplastic Elastomer Composition

The thermoplastic elastomer compositions of the present invention have adequate softness and permanent compression set, in particular excellent compression set at 70° C. or lower, and cause no significant environmental pollution, because the formed articles suffer only a limited extent of bleed-out of the softening agent even when exposed to an excessive stress-induced deformation or load.

Therefore, the thermoplastic elastomer compositions of the present invention can be used in various areas, when formed into a shape, e.g., sealing parts for medical and food purposes, electric appliance parts, bottle cap packings, sealing parts for automobiles, and multi-color sealing parts formed with a polyolefin or hard thermoplastic elastomer. They are particularly useful for sealing parts for ink in bubble jet printers or the like.

The thermoplastic elastomer compositions of the present invention are excellent in thermal adherance with a polyolefin resin, in particular polypropylene-based resin. Therefore, the formed article of the thermoplastic elastomer composition can be easily thermally adhered with a formed article of polypropylene-based resin, to form a thermal adhesion composite article.

Concrete examples of thermal adhesion composite articles include sealing parts for medical and food purposes, electric appliance parts, bottle cap packings, sealing parts for automobiles, and multi-color sealing parts. The composite articles are particularly useful for sealing parts for ink in bubble jet printers or the like.

EXAMPLES

The present invention is described in more detail in the following EXAMPLES and COMPARATIVE EXAMPLES, which by no means limit the present invention The properties of each composition were determined by the following methods (JIS being an abbreviation for Japanese Industrial Standard):
(1) Specific gravity was determined in accordance with JIS K-7112 for a 1 mm thick pressed sheet.
(2) Hardness was determined in accordance with JIS K-7215 for a 6.3 mm thick pressed sheet using a durometer (hardness type A).
(3) Tensile strength was determined in accordance with JIS K-6301 for a 1 mm thick pressed sheet punched into a No. 3 dumb-bell shape at a tensile speed of 500 mm/minute.
(4) 100% elongation stress was determined in accordance with JIS K-6301 for a 1 mm thick pressed sheet punched into a No. 3 dumb-bell shape at a tensile speed of 500 mm/minute.
(5) Breaking extension was determined in accordance with JIS K-6301 for a 1 mm thick pressed sheet punched into a No. 3 dumb-bell shape at a tensile speed of 500 mm/minute.
(6) Permanent compression set was determined in accordance with JIS K-6262 for a 6.3 mm thick pressed sheet after it was set at a deformation of 25% at 70° C. for 22 hours.
(7) Resistance to bleeding: The formed article was compressed at 25% at 70° C. for 168 hours, and visually observed for bleeding and blooming of low-molecular-weight components, to determine its resistance to bleeding according to the following standards:
◎: Very good
○: Good
Δ: Slightly bad
x: Bad
(8) Resistance to tacking: Two 1 mm thick pressed sheets, described above, were put one on another to prepare a test piece, which was kept under a load of 500 g/cm$^2$ for 24 hours and visually observed for separated conditions of the pressed sheets, to determine its resistance to tacking according to the following standards:
◎: Very good
○: Good
Δ: Slightly bad
x: Bad
(9) Injection moldability: A 130 by 130 by 2 mm injection-molded sheet was visually observed for flow marks and sinks on the surfaces, to determine its injection moldability according to the following standards:
◎: Very good
○: Good
Δ: Slightly bad
x: Bad
(10) Thermal adhering: Test piece 1 shown in FIGS. 1 to 3 was tested by the 180 degree peel back strength test, to determine its peel back strength.

Figure 1:
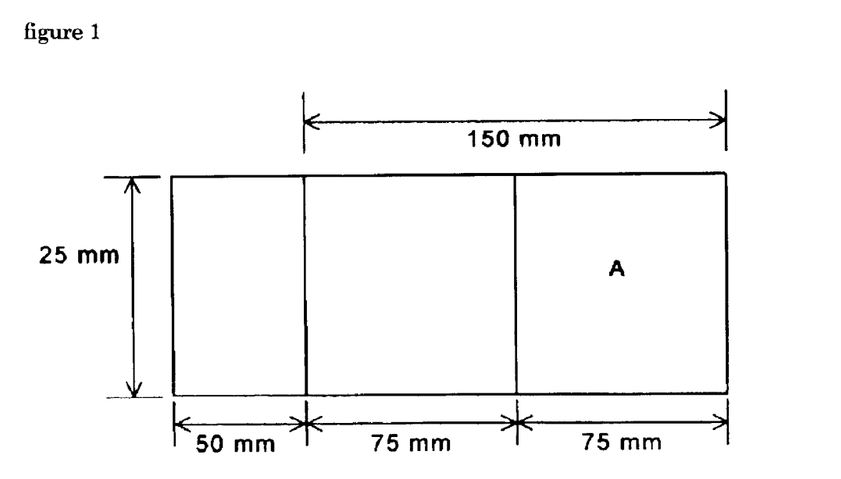
FIG. 1 is a front view of the test piece for determining peel back strength.
Figure 2:
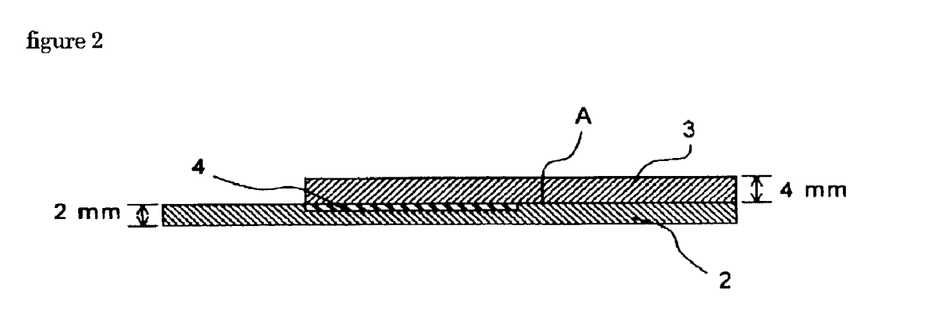
FIG. 2 is a cross-sectional view of the test piece for determining peel back strength.
Figure 3:
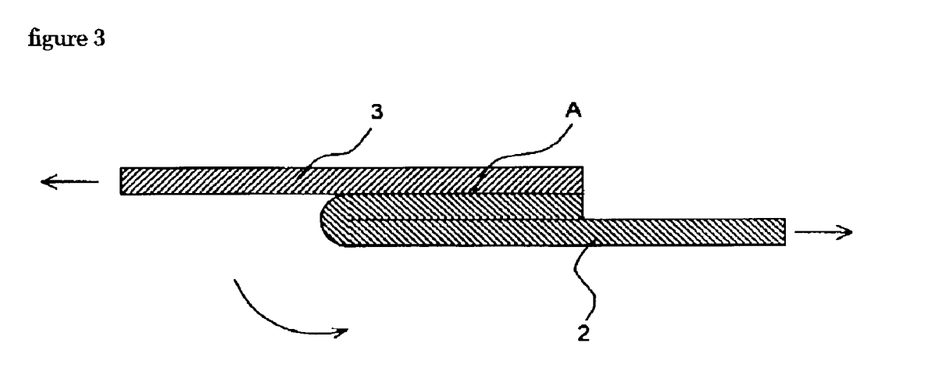
FIG. 3 is a cross-sectional view of the test piece for explaining the method of determining peel back strength.

Referring to FIGS. 1 to 3, the polypropylene resin plate 3, 150 mm long, 25 mm wide and 4 mm thick, was prepared by injection molding under the following injection conditions. The resin for the test plate is described below.
Polypropylene resin: PP-BC8 (Japan Polychem), Degree of crystallinity: Tm 166° C., ΔHm: 82 mJ/mg, MFR: 1.8 g/10 minutes
The injection molding conditions as recommended by the resin maker were as follows:

| | |
|---|---|
| Injection molder | FS-120 (Nissei Plastic Industrial) |
| Forming temperature | 180 to 220° C. |
| Mold temperature | 40° C. |
| Injection speed | 55 mm/second |
| Injection pressure | 1,400 kg/cm$^2$ |
| Dwelling pressure | 400 kg/cm$^2$ |
| Injection time | 6 seconds |
| Cooling time | 45 seconds |

Paper 4 was placed on part of the polypropylene resin 3 by double-faced tape. Resin 3 was inserted in a mold, and a thermoplastic elastomer composition was injected into the mold under the following conditions, to prepare the test piece of the polypropylene resin plate 3 and thermoplastic elastomer composition plate 2 having thermal adhesion to each other at area A.

| | |
|---|---|
| Injection molder | FS-120 (Nissei Plastic Industrial) |
| Forming temperature | 180 to 220° C. |
| Mold temperature | 40° C. |
| Injection speed | 55 mm/second |
| Injection pressure | 1,400 kg/cm$^2$ |
| Dwelling pressure | 0 kg/cm$^2$ |
| Injection time | 6 seconds |
| Cooling time | 45 seconds |

The test piece thus prepared was tested by the 180 degree peel back strength test, where the thermoplastic elastomer composition plate 2 was folded as shown in FIG. 3, and the end of the plate 2 and that of the plate 3 were pulled in the arrowed directions, to determine the 180 degree peel back strength according to the following standards:

⊚: Breaking of the material
Δ: Breaking at the interface
x: The plates separated from each other immediately after the test was started The components used in the EXAMPLES and COMPARATIVE EXAMPLES are as follows:

(1) Hydrogenated block copolymer as component (a-1; SEPS): SEPTON 4077 (Kuraray), Styrene content: 30% by weight, Number-average molecular weight: 260,000, Weight-average molecular weight: 320,000, Molecular weight distribution: 1.23, Degree of hydrogenation: 90% or more
(2) Hydrogenated block copolymer of conjugated diene compound as component (a-2; CEBC): DYNARON 6100P(JSR Corp.)
(3) Paraffin oil as component (b): PW 90 (Idemitsu Chemical), Number-average molecular weight: 980
(4) Petroleum hydrocarbon resin as component (c-1): Endex 155 (Eastman Chemical), Softening point: 151–155° C., Specific gravity: 1.05, Melt viscosity at 235° C.: 10 poise
(5) Petroleum hydrocarbon resin as component (c-2): Kristalex 5140 (Eastman Chemical), Softening point: 137–143° C., Specific gravity: 1.07, Melt viscosity at 180° C.: 10 poise
(6) Organic peroxide as component (d): PERHEXA-25B (NOF Corp.)
(7) Crosslinking aid as component (e): NK ESTER 3G (Shin-Nakamura Chemical)
(8) Peroxide-decomposed type olefin-based resin as component (f): PP-BC8 (Polypropylene (PP); Japan Polychem), Degree of crystallinity: Tm 166° C., ΔHm: 82 mJ/mg, MFR: 1.8 g/10 minutes
(9) Antioxidant of hindered phenol/phosphate/lactone-based composite as component
(g): HP2215 (Ciba Speciality Chemicals)

Examples 1 to 8, and Comparative Examples 1 to 16

The components shown in Tables 1 to 4 were method/kneaded into pellets by a twin screw extruder (L/D: 47) at 180° C. with 350 rpm as the screw speed. The resultant pellets were injection-molded to prepare test pieces which were tested for various characteristics. The results are given in Tables 1 to 4.

TABLE 1

| | | | EXAMPLES | | | |
|---|---|---|---|---|---|---|
| | | | 1 | 2 | 3 | 4 |
| Composition | Component (a-1) SEPS | Parts by weight | 100 | 100 | 100 | 100 |
| | Component (b) PW90 | Parts by weight | 100 | 100 | 100 | 100 |
| | Component (c-1) Endex155 | Parts by weight | 20 | 10 | 0 | 20 |
| | Component (c-2) Kristalex 5140 | Parts by weight | 0 | 15 | 25 | 0 |
| | Component (d) Peroxide | Parts by weight | 0.15 | 0.15 | 0.15 | 0 |
| | Component (e) NK Ester 3G | Parts by weight | 0 | 2.0 | 2.0 | 0 |
| | Component (g) Antioxidant | Parts by weight | 0 | 0.4 | 0.4 | 0 |
| Evaluation results | Specific gravity | | 0.90 | 0.91 | 0.92 | 0.92 |
| | Hardness | HDA | 31 | 35 | 28 | 27 |
| | Tensile strength | MPa | 6.5 | 7.2 | 7.9 | 7.5 |
| | Stress at 100% elongation | MPa | 1.0 | 1.0 | 1.3 | 0.8 |
| | Breaking extension | % | 650 | 580 | 510 | 890 |
| | Permanent compression set (70° C. × 22 hrs) | % | 25 | 21 | 23 | 20 |
| | Resistance to bleeding (70° C. × 168 hrs, after permanent compression set) | Visual observation | ⊚ | ⊚ | ⊚ | ○ |
| | Resistance to tacking | Visual observation | ⊚ | ⊚ | ⊚ | ○ |
| | Injection moldability | Visual observation | ⊚ | ⊚ | ⊚ | ○ |

TABLE 2

| | | | EXAMPLES | | | |
|---|---|---|---|---|---|---|
| | | | 5 | 6 | 7 | 8 |
| Composition | Component (a-2) CEBC | Parts by weight | 100 | 100 | 100 | 100 |
| | Component (b) PW90 | Parts by weight | 100 | 100 | 100 | 100 |
| | Component (c-1) Endex155 | Parts by weight | 20 | 10 | 0 | 20 |
| | Component (c-2) Kristalex 5140 | Parts by weight | 0 | 15 | 25 | 0 |
| | Component (d) Peroxide | Parts by weight | 0.15 | 0.15 | 0.15 | 0 |
| | Component (e) NK Ester 3G | Parts by weight | 0 | 2.0 | 2.0 | 0 |
| | Component (f) PP | Parts by weight | 5 | 5 | 5 | 5 |
| | Component (g) Antioxidant | Parts by weight | 0 | 0.4 | 0.4 | 0 |
| Evaluation results | Specific gravity | | 0.90 | 0.91 | 0.92 | 0.92 |
| | Hardness | HDA | 33 | 38 | 31 | 30 |
| | Tensile strength | MPa | 6.7 | 7.5 | 8.3 | 7.7 |
| | Stress at 100% elongation | MPa | 1.1 | 1.1 | 1.5 | 0.8 |
| | Breaking extension | % | 530 | 510 | 420 | 780 |
| | Permanent compression set | % | 33 | 38 | 31 | 30 |

TABLE 2-continued

|  |  | EXAMPLES | | | |
|---|---|---|---|---|---|
|  |  | 5 | 6 | 7 | 8 |
| (70° C. × 22 hrs) Resistance to bleeding (70° C. × 168 hrs, after permanent compression set) | Visual observation | ◉ | ◉ | ◉ | ○ |
| Resistance to tacking | Visual observation | ◉ | ◉ | ◉ | ○ |
| Injection moldability | Visual observation | ◉ | ◉ | ◉ | ○ |
| Thermal adhering | Visual observation | ◉ | ◉ | ◉ | ◉ |

TABLE 3

|  |  |  | COMPARATIVE EXAMPLES | | | | | | | |
|---|---|---|---|---|---|---|---|---|---|---|
|  |  |  | 1 | 2 | 3 | 4 | 5 | 6 | 7 | 8 |
| Composition | Component (a-1) SEPS | Parts by weight | 100 | 100 | 100 | 100 | 100 | 100 | 100 | 100 |
|  | Component (b) PW90 | Parts by weight | 20 | 180 | 100 | 100 | 20 | 180 | 100 | 100 |
|  | Component (c-1) Endex155 | Parts by weight | 20 | 20 | 2 | 130 | 20 | 20 | 2 | 130 |
|  | Component (c-2) Kristalex 5140 | Parts by weight | 0 | 0 | 0 | 0 | 0 | 0 | 0 | 0 |
|  | Component (d) Peroxide | Parts by weight | 0.15 | 0.15 | 0.15 | 0.15 | 0 | 0 | 0 | 0 |
|  | Component (e) NK Ester 3G | Parts by weight | 0 | 0 | 0 | 0 | 0 | 0 | 0 | 0 |
|  | Component (g) Antioxidant | Parts by weight | 0 | 0 | 0 | 0 | 0 | 0 | 0 | 0 |
| Evaluation results | Specific gravity |  | 0.91 | 0.89 | 0.90 | 0.90 | 0.91 | 0.89 | 0.90 | 0.90 |
|  | Hardness | HDA | 61 | 22 | 20 | 72 | 57 | 18 | 15 | 68 |
|  | Tensile strength | MPa | 6.8 | 3.1 | 2.3 | 7.1 | 6.5 | 2.2 | 1.5 | 7.6 |
|  | Stress at 100% elongation | MPa | 1.3 | 0.6 | 0.5 | 1.3 | 0.6 | 0.4 | 0.1 | 0.7 |
|  | Breaking extension | % | 520 | 430 | 840 | 630 | 470 | 480 | 900 | 720 |
|  | Permanent compression set (70° C. × 22 hrs) | % | 43 | 31 | 20 | 53 | 40 | 32 | 22 | 51 |
|  | Resistance to bleeding (70° C. × 168 hrs, after permanent compression set) | Visual observation | ○ | X | ○ | ○ | ○ | X | X | X |
|  | Resistance to tacking | Visual observation | ○ | X | ○ | ○ | ○ | X | X | X |
|  | Injection moldability | Visual observation | X | X | X | X | X | X | X | X |

TABLE 4

|  |  |  | COMPARATIVE EXAMPLES | | | | | | | |
|---|---|---|---|---|---|---|---|---|---|---|
|  |  |  | 9 | 10 | 11 | 12 | 13 | 14 | 15 | 16 |
| Composition | Component (a-2) CEBC | Parts by weight | 100 | 100 | 100 | 100 | 100 | 100 | 100 | 100 |
|  | Component (b) PW90 | Parts by weight | 20 | 180 | 100 | 100 | 20 | 180 | 100 | 100 |
|  | Component (c-1) Endex155 | Parts by weight | 20 | 20 | 2 | 130 | 20 | 20 | 2 | 130 |
|  | Component (c-2) Kristalex 5140 | Parts by weight | 0 | 0 | 0 | 0 | 0 | 0 | 0 | 0 |
|  | Component (d) Peroxide | Parts by weight | 0.15 | 0.15 | 0.15 | 0.15 | 0 | 0 | 0 | 0 |
|  | Component (e) NK Ester 3G | Parts by weight | 0 | 0 | 0 | 0 | 0 | 0 | 0 | 0 |
|  | Component (f) PP | Parts by weight | 5 | 5 | 5 | 5 | 5 | 5 | 5 | 5 |
|  | Component (g) Antioxidant | Parts by weight | 0 | 0 | 0 | 0 | 0 | 0 | 0 | 0 |
| Evaluation results | Specific gravity |  | 0.91 | 0.89 | 0.90 | 0.90 | 0.91 | 0.89 | 0.90 | 0.90 |
|  | Hardness | HDA | 63 | 25 | 23 | 76 | 63 | 21 | 18 | 71 |
|  | Tensile strength | MPa | 7.3 | 3.3 | 2.5 | 7.5 | 6.8 | 2.3 | 1.6 | 7.8 |
|  | Stress at 100% elongation | MPa | 1.5 | 0.7 | 0.6 | 1.5 | 0.6 | 0.5 | 0.1 | 0.8 |
|  | Breaking extension | % | 450 | 380 | 750 | 560 | 420 | 410 | 680 | 620 |
|  | Permanent compression set (70° C. × 22 hrs) | % | 46 | 35 | 23 | 56 | 43 | 35 | 25 | 56 |
|  | Resistance to bleeding (70° C. × 168 hrs, after permanent compression set) | Visual observation | ○ | X | ○ | ○ | ○ | X | X | X |
|  | Resistance to tacking | Visual observation | ○ | X | ○ | ○ | ○ | X | X | X |
|  | Injection moldability | Visual observation | X | X | X | X | X | X | X | X |
|  | Thermal adhering | Visual observation | ◉ | ◉ | ◉ | ◉ | ◉ | ◉ | ◉ | ◉ |

As shown in Tables 1 and 2, each of the thermoplastic elastomer compositions of EXAMPLES 1 to 8 was a composition according to the present invention. Each had good properties, whether or not it contained the optional components (d) to (g). The thermoplastic elastomer composition of EXAMPLE 4 was particularly excellent in properties related to resealing and safety for medical equipment parts (Food Hygiene Act; standards for foods and additives, (Notification No.370 of the Japanese Ministry of Health and Welfare issued in 1959), standards for tools and container wrappings of synthetic resin mainly composed of polystyrene (Notification No. 20 of the Japanese Ministry of Health and Welfare issued in 1982)). The thermoplastic elastomer compositions of the present invention, prepared by incorporating polypropylene (PP) in the composition prepared in each of EXAMPLES 1 to 4 at 5 parts by weight per 100 parts by weight of SEPS, showed good ability of thermal adhesion with a formed article of PP.

The similarly good results were observed when the component (a-1) was replaced by DYNARON 6100P (JSR Corp.) as the component (a-2) hydrogenated block copolymer of conjugated diene compound. DYNARON 6100P (JSR Corp.) is a block copolymer (CEBC) composed of the crystalline ethylene block and non-crystalline ethylene-butene block, which is obtained by hydrogenating a block copolymer of butadiene. The compositions prepared in each of EXAMPLES 5 to 8 contained PP and showed good thermal adhesion with a formed article of PP.

On the other hand, the compositions of each of COMPARATIVE EXAMPLES 1 to 2 and 9 to 10 contained component (b) at a content outside of the range for the present invention. When the component (b) was contained at a content below the range for the present invention, the resulting thermoplastic elastomer composition had an excessively high hardness, lost softness, could not give the product a rubber touch, and had deteriorated injection moldability. When the component (b) was contained at a content above the range, the resulting thermoplastic elastomer composition suffered notable bleeding, and had deteriorated resistance to tacking and deteriorated injection moldability (due to occurrence of remarkable gas burn mark, sticking in the mold and mold contamination). The compositions of each of COMPARATIVE EXAMPLES 3 to 4 and 11 to 12 contained the component (c-1) at a content outside of the range for the present invention. When the component (c-1) was contained at a content below the range for the present invention, the resulting thermoplastic elastomer composition had deteriorated injection moldability. When the component (c-1) was contained at a content above the range, the resulting thermoplastic elastomer composition lost softness, and had deteriorated rubber elasticity and deteriorated injection moldability (due to occurrence of remarkable sink mark, flash and stringiness).

The compositions of each of COMPARATIVE EXAMPLES 5 to 6 and 13 to 14 contained the component (b) at a content outside of the range for the present invention. When the component (b) was contained at a content below the range for the present invention, the resulting thermoplastic elastomer composition had an excessively high hardness, lost softness, could not give the product a rubber touch, and had deteriorated injection moldability. When the component (b) was contained at a content above the range, the resulting thermoplastic elastomer composition suffered notable bleeding, had deteriorated degree of non-tackiness and injection moldability, and was insufficient in safety for use as medical equipment parts.

The compositions of each of COMPARATIVE EXAMPLES 7 to 8 and 15 to 16 contained the component (c-1) at a content outside of the range for the present invention. When the component (c-1) was contained at a content below the range for the present invention, the resulting thermoplastic elastomer composition had deteriorated injection moldability. When the component (c-1) was contained at a content above the range, the resulting thermoplastic elastomer composition lost softness, had deteriorated rubber elasticity and injection moldability, and was insufficient in safety for use as medical equipment parts.

The thermoplastic elastomer compositions of the present invention are controlled in bleed-out of the softening agent, excellent in softness, permanent compression set, and the formed article of the thermoplastic elastomer composition of the present invention cause no pollution of the ambient environments and can be used as excellent parts for various purposes. In particular, the compositions causes no deterioration of ink when used for an elastic part or the like for bubble jet printers, cause no deterioration of the content in a bottle when used for a bottle cap packing or the like, and cause no bleeding when used for a formed composite articles, e.g., multi-color sealing parts or the like formed with a polyolefin or hard thermoplastic elastomer, which articles are represented by sealing parts for medical purposes, food purposes and electric appliances.

What is claimed is:

1. A thermoplastic elastomer composition containing:
    (a) 100 parts by weight of at least one hydrogenated block copolymer selected from the group consisting of
    (a-1) a hydrogenated block copolymer obtained by hydrogenating a block copolymer composed of at least 2 polymer blocks A mainly based on an aromatic vinyl compound and at least one polymer block B mainly based on a conjugated diene compound, and
    (a-2) a hydrogenated block copolymer obtained by hydrogenating a block copolymer based on a conjugated diene compound;
    (b) 30 to 150 parts by weight of a non-aromatic softening agent for rubber; and
    (c) 3 to 100 parts by weight of a petroleum hydrocarbon resin having a softening point of 80 to 170, said resin exhibiting a melt viscosity of 10 poise at a temperature in the range of 120 to 250.

2. The thermoplastic elastomer composition according to claim 1, which further contains (d) 0.01 to 3 parts by weight of an organic peroxide.

3. The thermoplastic elastomer composition according to claim 1, which further contains (f) 0.1 to 25 parts by weight of a peroxide-decomposed polyolefin resin.

4. The thermoplastic elastomer composition according to claim 2, which further contains (e) 0.1 to 10 parts by weight of an ester-based crosslinking aid.

5. The thermoplastic elastomer composition according to claim 2, which further contains (f) 0.1 to 25 parts by weight of a peroxide-decomposed polyolefin resin.

6. The thermoplastic elastomer composition according to claim 4, which further contains (f) 0.1 to 25 parts by weight of a peroxide-decomposed polyolefin resin.

7. A formed article composed of the thermoplastic elastomer composition containing:
    (a) 100 parts by weight of at least one hydrogenated block copolymer selected from the group consisting of:
    (a-1) a hydrogenated block copolymer obtained by hydrogenating a block copolymer composed of at least 2 polymer blocks A mainly based on an aromatic vinyl compound and at least one polymer block B mainly based on a conjugated diene compound, and (a-2) a hydrogenated block copolymer obtained by hydrogenating a block copolymer based on a conjugated diene compound;

(b) 30 to 150 parts by weight of a non-aromatic softening agent for rubber; and (c) 3 to 100 parts by weight of a petroleum hydrocarbon resin having a softening point of 80 to 170, said resin exhibiting a melt viscosity of 10 poise at a temperature in the range of 120 to 250.

8. An elastic part composed of the formed article according to claim 7 for medical, food or bubble jet printer purpose.

9. A thermal adhesion formed composite article composed of the formed article according to claim 7 and a formed article of polypropylene-based resin which are thermally adhered to each other under heating.

10. An elastic part composed of the thermal adhesion formed composite article according to claim 9 for medical, food or bubble jet printer purpose.

11. A formed article composed of the thermoplastic elastomer composition containing:

(a) 100 parts by weight of at least one hydrogenated block copolymer selected from the group consisting of:

(a-1) a hydrogenated block copolymer obtained by hydrogenating a block copolymer composed of at least 2 polymer blocks A mainly based on an aromatic vinyl compound and at least one polymer block B mainly based on a conjugated diene compound, and (a-2) a hydrogenated block copolymer obtained by hydrogenating a block copolymer based on a conjugated diene compound;

(b) 30 to 150 parts by weight of a non-aromatic softening agent for rubber;

(c) 3 to 100 parts by weight of a petroleum hydrocarbon resin having a softening point of 80 to 170, said resin exhibiting a melt viscosity of 10 poise at a temperature in the range of 120 to 250; and (d) 0.01 to 3 parts by weight of an organic peroxide.

12. An elastic part composed of the formed article according to claim 11 for medical, food or bubble jet printer purpose.

13. A thermal adhesion formed composite article composed of the formed article according to claim 11 and a formed article of polypropylene-based resin which are thermally adhered to each other under heating.

14. An elastic part composed of the thermal adhesion formed composite article according to claim 13 for medical, food or bubble jet printer purpose.

* * * * *